United States Patent
Evans et al.

(10) Patent No.: US 11,624,717 B2
(45) Date of Patent: Apr. 11, 2023

(54) SAMPLE INSPECTION SYSTEM

(71) Applicants: THE NOTTINGHAM TRENT UNIVERSITY, Nottingham (GB); CRANFIELD UNIVERSITY, Cranfield (GB)

(72) Inventors: Paul Evans, Nottingham (GB); Keith Rogers, Swindon (GB)

(73) Assignees: The Nottingham Trent University, Nottingham (GB); Cranfield University, Cranfield (GB)

(*) Notice: Subject to any disclaimer, the term of this patent is extended or adjusted under 35 U.S.C. 154(b) by 264 days.

(21) Appl. No.: 17/262,401

(22) PCT Filed: Jul. 10, 2019

(86) PCT No.: PCT/GB2019/051934
§ 371 (c)(1),
(2) Date: Jan. 22, 2021

(87) PCT Pub. No.: WO2020/021229
PCT Pub. Date: Jan. 30, 2020

(65) Prior Publication Data
US 2021/0293728 A1  Sep. 23, 2021

(30) Foreign Application Priority Data
Jul. 24, 2018 (GB) .................................. 1812042

(51) Int. Cl.
*G01N 23/205* (2018.01)
*G01N 23/20008* (2018.01)
*G01V 5/00* (2006.01)

(52) U.S. Cl.
CPC ..... *G01N 23/20008* (2013.01); *G01V 5/0025* (2013.01); *G01V 5/0041* (2013.01);
(Continued)

(58) Field of Classification Search
None
See application file for complete search history.

(56) References Cited

U.S. PATENT DOCUMENTS 5,602,893 A * 2/1997 Harding ............... G01V 5/0025
378/86
2003/0210761 A1  11/2003 Hoffman
(Continued)

FOREIGN PATENT DOCUMENTS

| GB | 2560165 A | | 9/2018 |
|---|---|---|---|
| GB | 2592684 A | * | 8/2021 |
| WO | 2008149078 A1 | | 12/2008 |

OTHER PUBLICATIONS

Great Britain Combined Search and Examination Report dated Jan. 25, 2019 from corresponding Great Britain Application No. GB1812042. 8, 5 pages.
(Continued)

*Primary Examiner* — Hoon K Song
(74) *Attorney, Agent, or Firm* — Ruggiero McAllister & McMahon LLC

(57) ABSTRACT

There is presented an apparatus for identifying a sample. Such an apparatus may be used to detect unwanted items as part of a security screening system. The apparatus includes a platform for receiving the sample, at least one electromagnetic radiation emitter, a plurality of detectors and a calculator. The electromagnetic radiation emitter is adapted to provide a plurality of conical shells of radiation. Each conical shell has a characteristic propagation axis associated with it. The detectors are arranged to detect radiation diffracted by the sample upon incidence of one or more conical shells of radiation. Each detector is located on the characteristic propagation axis associated with a corresponding conical shell. The calculator is adapted to calculate a param-
(Continued)

eter of the sample based on the detected diffracted radiation. The parameter includes a lattice spacing of the sample.

20 Claims, 11 Drawing Sheets

(52) U.S. Cl.
CPC .......... *G01N 2223/316* (2013.01); *G01N 2223/3303* (2013.01); *G01N 2223/643* (2013.01)

(56) References Cited

U.S. PATENT DOCUMENTS

| | | | |
|---|---|---|---|
| 2009/0285353 A1 | 11/2009 | Ellenbogen et al. | |
| 2015/0362443 A1* | 12/2015 | Evans | H04N 5/32 378/4 |
| 2020/0041427 A1* | 2/2020 | Mayo | G01N 23/20091 |

OTHER PUBLICATIONS

International Search Report dated Nov. 13, 2019 from corresponding International Application No. PCT/GB2019/051934, 5 pages.
Written Opinion dated Nov. 13, 2019 from corresponding International Application No. PCT/GB2019/051934, 9 pages.
Dicken et al.; "Combined X-ray Diffraction and Kinetic Depth Effect Imaging", Optics Express 6406, Mar. 28, 2011, vol. 19, No. 7, 8 pages.
Dicken et al.; "Depth Resolved Snapshot Energy-dispersive X-ray Diffraction Using a Conical Shell Beam", Optics Express 21321, Sep. 4, 2017, vol. 25, No. 18, 8 pages.
Dicken et al.; "Energy-dispersive X-ray Diffraction Using an Annular Beam", Optics Express 6304, Mar. 2, 2015, vol. 23, No. 5, 9 pages.
Dicken et al.; "High Energy Transmission Annular Beam X-ray Diffraction", Optics Express 13443, May 18, 2015, vol. 23, No. 10, 12 pages.

* cited by examiner

SAMPLE INSPECTION SYSTEM

CROSS-REFERENCE TO RELATED PATENT APPLICATIONS

This application claims priority under 35 U.S.C. § 119(a) to United Kingdom Patent Application No. GB 1812042.8 filed on Jul. 24, 2018 and is a national phase application under 35 U.S.C. § 371, of International Patent Application No. PCT/GB2019/051934 filed on Jul. 10, 2019 the contents of all of which are incorporated by reference herein in their entirety.

BACKGROUND OF THE DISCLOSURE

1. Field of the Disclosure

The disclosure relates to a sample inspection system and in particular a sample inspection system using a plurality of conical shells of high-energy electromagnetic radiation.

2. Description of the Related Art

Practical real-world security scanning systems as used in airports and other environments where security screening is needed require a fast and reliable way of detecting unwanted and potentially life-threatening items.

X-rays interact with matter through different processes including absorption, elastic (Rayleigh) and inelastic (Compton) scattering processes. Absorption based techniques such as dual-energy X-ray computed tomography establish average atomic number and density but does not provide structural information and material phase identification via d-spacings, which ultimately limits the probability of detection and increases the false alarm rate.

Techniques based on scattering are more accurate but inherently slow. In an elastic scattering process, an outgoing X-ray has the same wavelength as an incoming X-ray and so a diffraction pattern produced by the scattered radiation can be used to determine the lattice structure and thus material identity of the matter of the sample which is under inspection. This technique is commonly referred to as X-ray crystallography and may be used to identify the nature of a material or a chemical present in an inspected object with a high degree of accuracy.

However, in general the intensity of radiation that is scattered is relatively low as compared with the intensity of radiation that is available for absorption imaging. For example, in conventional X-ray crystallography relatively long data collection periods are required to accumulate a sufficient amount of signal for accurate measurement. For this reason, X-ray crystallography is a relatively slow technique and is used primarily in laboratories for analysis of materials, but is not suitable generally for interrogating everyday objects or for use in real-time or on-line inspection applications.

It is an object of the disclosure to address one or more of above-mentioned limitations.

SUMMARY

According to a first aspect of the disclosure, there is provided an apparatus for identifying a sample, the apparatus comprising: a platform for receiving the sample; at least one electromagnetic radiation emitter adapted to provide a plurality of conical shells of radiation; wherein each conical shell has a characteristic propagation axis associated with it; a plurality of detectors arranged to detect radiation diffracted by the sample upon incidence of one or more conical shells of radiation; wherein each detector is located on the characteristic propagation axis associated with a corresponding conical shell; and a calculator adapted to calculate a parameter of the sample based on the detected diffracted radiation; wherein the parameter comprises a lattice spacing of the sample.

Optionally, the at least one electromagnetic radiation emitter and the plurality of detectors are provided on a frame having a closed-shaped perimeter. For example, the frame may have a circular shape or a polygonal shape. The frame may surround at least partially the platform.

Optionally, the plurality of conical shells of radiation diverge from each other and wherein the characteristic propagation axes associated with the plurality of conical shells of radiation are distributed in a single plane.

Optionally, the electromagnetic radiation emitter comprises a source of electromagnetic radiation coupled to a beam former.

Optionally, the beam former comprises a body provided with a plurality of slits having a truncated conical shape profile to provide the plurality of conical shells of radiation.

Optionally, the electromagnetic radiation emitter comprises a slit collimator to generate a fan-shaped beam.

Optionally, the source of electromagnetic radiation comprises a source of ionizing radiation. For example, the source of electromagnetic radiation may comprise at least one of a source of X-ray radiation and a source of gamma radiation.

Optionally, the source of electromagnetic radiation is a polychromatic source.

Optionally, the apparatus comprises a controller to control an operation of the apparatus; the controller being adapted to identify a preferred sampling configuration corresponding to a maximum detected signal strength.

For example, the preferred sampling configuration may be a configuration of the at least one electromagnetic radiation emitter and the plurality of detectors. For instance, to identify a preferred sampling configuration, the controller may identify a position of an electromagnetic radiation emitter at a particular point in time, and a specific detector among the plurality of detectors to perform data collection. Alternatively, to identify a preferred sampling configuration, the controller may identify a particular electromagnetic emitter associated with a particular detector among a plurality of the electromagnetic radiation emitters and detectors.

Optionally, the apparatus is adapted to collect data for an extended period of time in the preferred sampling configuration.

Optionally, the apparatus comprises a mechanical arrangement adapted to rotate the electromagnetic radiation emitter and the plurality of detectors with respect to a rotational axis.

For example, a region between the electromagnetic radiation emitter and the plurality of detectors define a sampling plane; and wherein the rotational axis extends substantially perpendicular to the sampling plane.

Optionally, at least one electromagnetic radiation emitter comprises a first electromagnetic radiation emitter adapted to provide a first set of conical shells of radiation, and a second electromagnetic radiation emitter adapted to provide a second set of conical shells of radiation; and wherein the first and second electromagnetic radiation emitters are adapted to emit each conical shell of radiation among the first and second set in a chronological order, or to emit each conical shell of radiation among the first and second set simultaneously.

Optionally, the controller is coupled to the platform and to the mechanical arrangement; the controller being adapted to move at least one of the platform and the mechanical arrangement to identify the preferred sampling configuration.

Optionally, the controller is adapted to set a sequence defining the chronological order.

Optionally, the calculator is adapted to run an artificial intelligence algorithm or a deep learning algorithm to identify the parameter of the sample.

Optionally, the calculator is adapted to perform a back-projection along the plurality of conical shells to obtain an image of the sample. Optionally, the plurality of detectors comprises a plurality of point detectors. For example, the point detectors may be energy resolving detectors.

Optionally, the plurality of detectors comprises a plurality of area detectors.

Optionally, at least some of the area detectors are provided with a grid structure formed of cells. For example, the grid structure may comprise lamellae which intersect to form the cells.

Optionally, at least one of the area detectors is provided with a coded aperture; and wherein a range detector is provided, the range detector being arranged to collect radiation transmitted through the coded aperture.

According to a second aspect of the disclosure, there is provided a method of identifying a sample, the method comprising providing a plurality of conical shells of electromagnetic radiation; wherein each conical shell has a characteristic propagation axis associated with it; providing a plurality of detectors arranged to detect radiation diffracted by the sample upon incidence of one or more conical shells of radiation; wherein each detector is located on the characteristic propagation axis associated with a corresponding conical shell; detecting radiation diffracted by the sample; and calculating a parameter of the sample based on the detected diffracted radiation; wherein the parameter comprises a lattice spacing of the sample.

Optionally, the method comprises illuminating the sample with a different conical shell of radiation at different points in time.

Optionally, the method comprises identifying a preferred sampling configuration corresponding to maximum detected signal strength.

Optionally, identifying the preferred sampling configuration comprises identifying a position of an electromagnetic radiation emitter providing the plurality of conical shells of radiation at a particular point in time, and identifying a specific detector among the plurality of detectors to perform data collection.

Optionally, the method comprises collecting data for an extended period of time using the preferred sampling configuration.

Optionally, the method comprises rotating the plurality of conical shells of electromagnetic radiation and the plurality of detectors with respect to a rotational axis.

Optionally, the method comprises identifying directions of the propagation axes of the conical shell beams for different times; forming a three-dimensional matrix by accumulating the detected radiation diffracted by the sample over a rotation of the plurality of conical shell; and integrating elements of the matrix to form an image.

The method according to the second aspect of the disclosure may comprise any of the features described above in relation to the apparatus according to the first aspect of the disclosure.

BRIEF DESCRIPTION OF THE DRAWINGS

The disclosure is described in further detail below by way of example and with reference to the accompanying drawings, in which.

DETAILED DESCRIPTION

Figure 1:
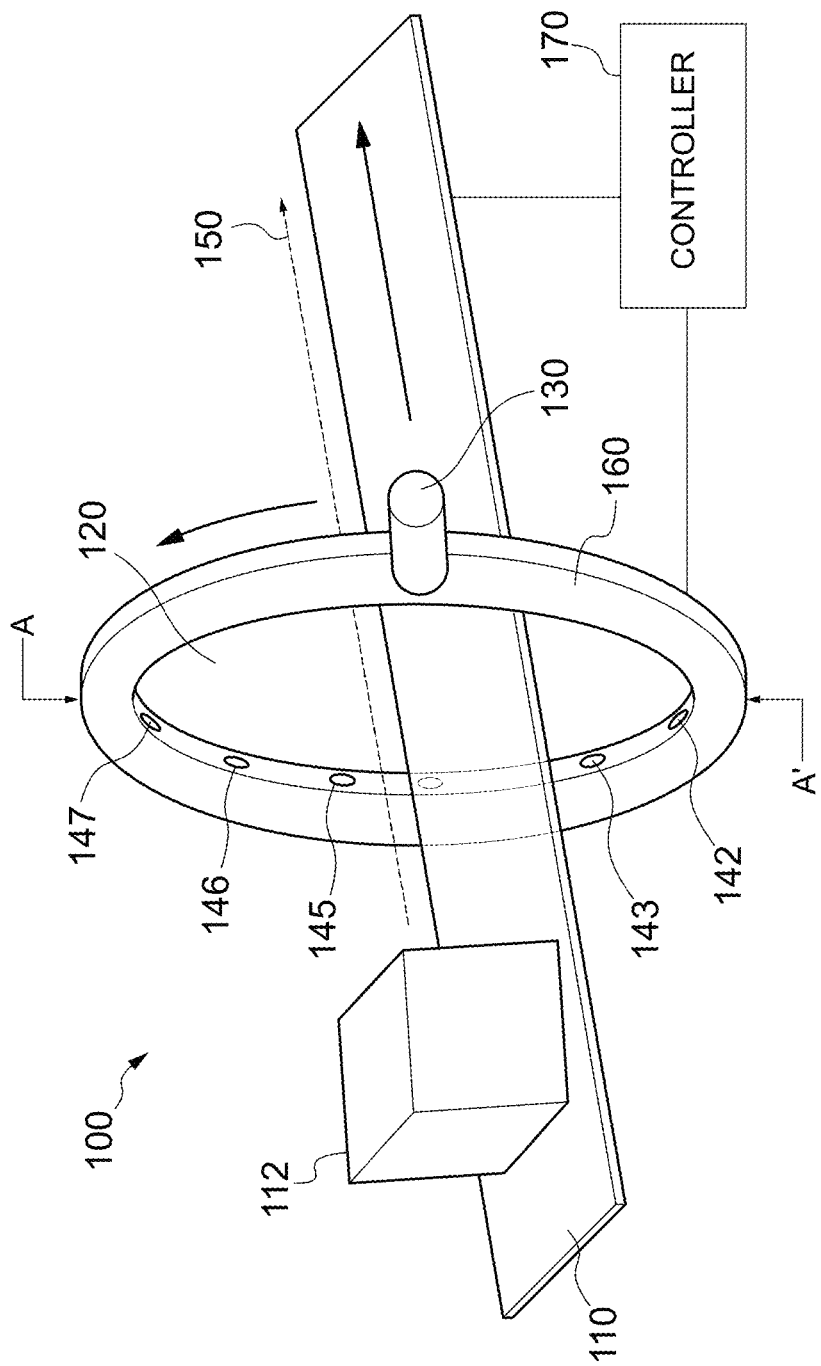
FIG. 1 is a schematic diagram of an apparatus for identifying a sample.

FIG. 1 is a perspective view of an apparatus 100 for identifying a sample according to an embodiment of the disclosure. The apparatus 100 includes a platform 110 for receiving the sample, an electromagnetic radiation (EM) emitter 130 adapted to provide a plurality of conical shells of radiation, not shown.

For example, the EM radiation emitter 130 may be adapted to provide high energy electromagnetic radiations. The high EM radiations may include ionizing radiations such as X-ray or gamma-ray radiations. For example, the high energy EM radiations may have photons of energy greater than about 1 keV. The high energy EM radiations may be hard X-ray radiations having photons of energy greater than about 10 keV. For example, the EM emitter 130 may include an X-ray source for providing X-rays having an energy in the region of up to 200 keV or more. The spectrum of energies employed is task dependent and has to take into account the expected size and density of the objects under inspection as well as the spectral profile or output of the X-ray source.

The platform 110 may comprise a conveyor belt for moving a container 112 towards a detection area 120. The container 112 may contain one or more samples to be inspected. The EM emitter 130 faces a series of eight detectors labelled 141 to 148 (see also FIG. 2). The detectors 141-148 are arranged to detect high energy electromagnetic radiations, such as X-rays transmitted through the container 112. The detection area 120 is defined by a region of space which can be located between the EM emitter 130 and the plurality of detectors 141-148, in the various different rotational positions or other configurations of the system. The detectors 141-148 are distributed along a semi-circular profile opposite to the EM emitter 130. In this example, the detection area 120 is substantially of the shape of a circular cylinder centred around a rotational axis 150. The axis of rotation 150 may be provided at or near the centre of the detection region 120.

A mechanical arrangement is provided to rotate the EM radiation emitter 130 and the plurality of detectors 141-148 with respect to the rotational axis 150. The mechanical arrangement is adapted to move the EM emitter 130 and the plurality of detectors synchronously.

This may be achieved using different approaches. The EM emitter 130 and the plurality of detectors 141-148 may be mounted on one or more movable supports capable of rotating the emitter and the plurality of detectors with respect to the axis of rotation 150. In the present example, the EM emitter 130 and the detectors 141-148 are affixed to a frame 160. For example, the frame 160 may be a housing which carries the EM emitter 130 and the plurality of X-ray detectors 141-148. A drive mechanism, not shown is provided to move the frame 160. The drive mechanism is coupled to a controller 170 which provides control signals for controlling its operation. The controller 170 may also control motion of the platform 110 and may interface with a computer control system.

The rotational speed of the EM emitter/detector module may be set to different speeds. For instance, the rotational speed may be in the region of zero to about four revolutions per second. Optionally, the rotation may be slowed or halted to stare at a specific region to improve signal-to-noise and provide enhanced false alarm resolution. For instance, the detected signal may be the strongest when the sample is inspected along a path of least signal attenuation (least absorption) or maximum average signal density.

Such a path referred to as staring-path may be chosen to perform additional inspection of the sample. The staring path could be identified during a pre-screening step. For instance, the system may operate as its own pre-screener via adaptively controlling scanning and rotation speed of the EM emitter/detector module.

The controller 170 may be adapted to move the platform 110 and/or the frame 160 in different ways. For instance, the platform 110 may be translated with respect to the frame 160, and the frame rotated around the axis 150. The frame 160 may be stopped at individual discrete positions allowing the frame 160 to be rotated fully for each individual position. Therefore, for each slice or plane of the sample, a full annular scan can be obtained. The controller 170 may also be adapted to perform a helical scan. In this case, the platform 110 may be kept in a fixed position, while the frame 160 is both translated with respect to the frame and rotated.

The emitter 130 and each detector would therefore move along a relatively helical trajectory with respect to the object under inspection.

The controller 170 can also identify a preferred sampling configuration corresponding to a maximum detected signal strength. For instance, to identify a preferred sampling configuration, the controller may identify a position of the electromagnetic radiation emitter 130 at a particular point in time, and a specific detector, for example detector 146, to perform data collection.

The detectors 141-148 can be coupled with an appropriate system to store and analyse the data collected by the detectors. The system may comprise a computer which executes instructions for carrying out processing of the data. The instructions may be downloaded or installed from a computer-readable medium which is provided for implementing data analysis according to the disclosure.

For example, the computer may include a processor adapted to run an algorithm to calculate a parameter of the sample which may be used to identify the sample. For instance, the parameter may be a lattice spacing (d-spacing) of the sample. Sample identification may then be communicated to a user by a suitable display or other type of indicia such as an audible or visible alarm signal. When a computer having a display is used, graphical and audio alerts can be generated when one or more particular substances are identified; and more complex data can be displayed in text or graphical format as appropriate.

The processor may be adapted to run an artificial intelligence algorithm or a deep learning algorithm for determining the d-spacing of the sample based on the collected scattered signal. Such a processor may be located in the controller 170 or on a remote server in communication with the controller.

An image of an object under inspection can also be generated, hence allowing to locate the sample of interest. For instance, the diffracted X-ray flux can be used to generate an image. Optionally, the diffracted flux image could be mapped onto another image having a higher spatial resolution obtained from X-ray absorption measurements. An absorption tomogram could be obtained using different arrangements. For example, ring shaped spectroscopic or dual-energy X-ray detectors may be used for sampling the circular beam footprints. Alternatively, the X-ray source may be provided with a slit collimator for generating a fan-shaped beam detected by a linear detector. In yet another arrangement, a pinhole optically coupled to an energy resolving pixelated detector may be implemented as described in Optics Express vol 25, Number 18, September 2017 page 21321-21328.

The processor may be adapted to perform a back-projection along the plurality of conical shells to obtain an image of the sample. For each beam, signals derived or parameters calculated from a gauge volume may be back projected to obtain a projected area associated with a particular angle of incidence of the conical shell onto the sample. At least one projected area is obtained for a specific angle of incidence. Then back projections obtained at different angle of incidence are compared to identify intersections areas.

Figure 2:
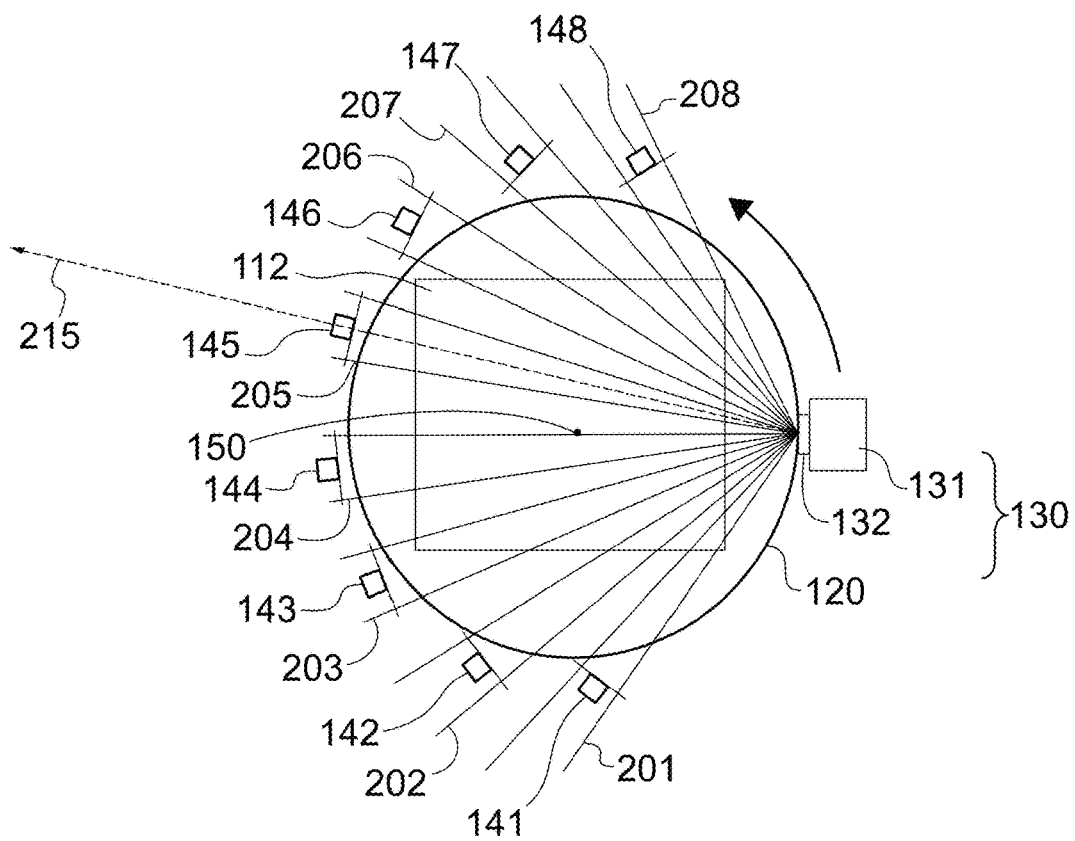
FIG. 2 is a sectional view of the apparatus of FIG. 1.

FIG. 2 shows a cross section of the detection area 120 of FIG. 1 along a line A-A'. The cross section shows an X-ray beam topology that includes a plurality of conical shells of EM radiation, diverging from an EM source 131.

The EM emitter 130 includes an EM source 131, for example an X-ray source aligned with a mask or beam former 132 for forming a plurality of conical shells of X-ray radiation. The EM source 131 may be a polychromatic source or a monochromatic source of EM radiation. In practice a polychromatic source provides more EM flux and therefore can lead to a faster data collection. The EM source 131 may also be chosen to provide a relatively large solid angle of radiation to generate more conical shells. The mask 132 may be formed by a radiopaque material provided with a plurality of conical slits. In the present example the mask 132 is provided with eight conical slits for forming eight conical shells labelled 201, 202, 203, 204, 205, 206, 207, and 208. Each conical shell 201-208 propagates along a characteristic transmission axis associated with it. Each detector 141-148 is located along the characteristic propagation axis associated with the corresponding conical shell 201-208. For example, conical shell 205 propagates along the characteristic transmission axis 215, also referred to as propagation axis. The detection area 120 is represented by a circular profile representing the circular path of the EM emitter 130. The detectors 141-148 are arranged with respect to the emitter 130 such that each detector is located on a propagation axis associated with a corresponding conical shell. For example, detector 145 is located on the transmission axis 215. It will be appreciated that the number of conical shells of radiation and the number of detectors may vary depending on the application. As the number of conical shells increases, a gap between adjacent conical shells decreases.

The relative position of the detectors may also depend on the opening angle of the conical shell beams. In general, the higher the signal energy the smaller the opening angle of the associated conical shell primary beam.

The axis of rotation is preferably chosen such that an in-plane beam surface intersects the centre of rotation. For instance, in FIG. 2, the centre of rotation 150 intersects the conical shell of the beam 204. Using this configuration, the whole sampling area is scanned hence preventing the presence of uninspected volumes around the centre of rotation.

Figure 3A:
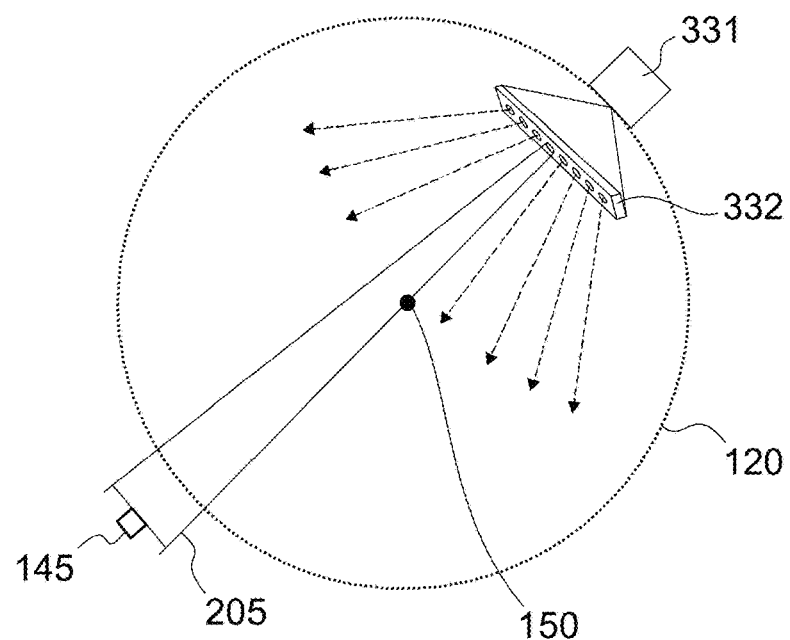
FIG. 3(a) is a diagram of a beam former for generating multiple conical shell of electromagnetic radiation.

FIG. 3 shows a diagram of a mask or beam former 332 for generating multiple conical shells of EM radiations. Same components to those illustrated in FIG. 2, are labelled with the same reference numerals. For clarity FIG. 3(a) only represents a single conical shell 205. The mask 332 is formed by a solid body 350, made of a radiopaque material, provided with a plurality of conical shell slits. Example of radiopaque materials that can block X-rays include tungsten or alloys made of steel and lead. In this example the body 350 has a cuboid shape of thickness D.

Figure 3B:
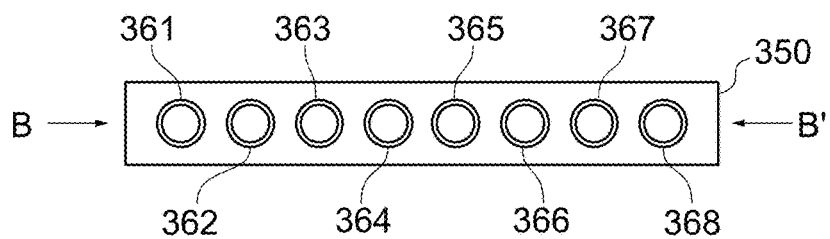
FIG. 3(b) is a front view of the beam former of FIG. 3(a).

FIG. 3b is a front view of the mask 332 showing eight annulus openings aligned along a longitudinal axis of the body 350, and corresponding to the eight conical shell slits 361-368.

Figure 3C:
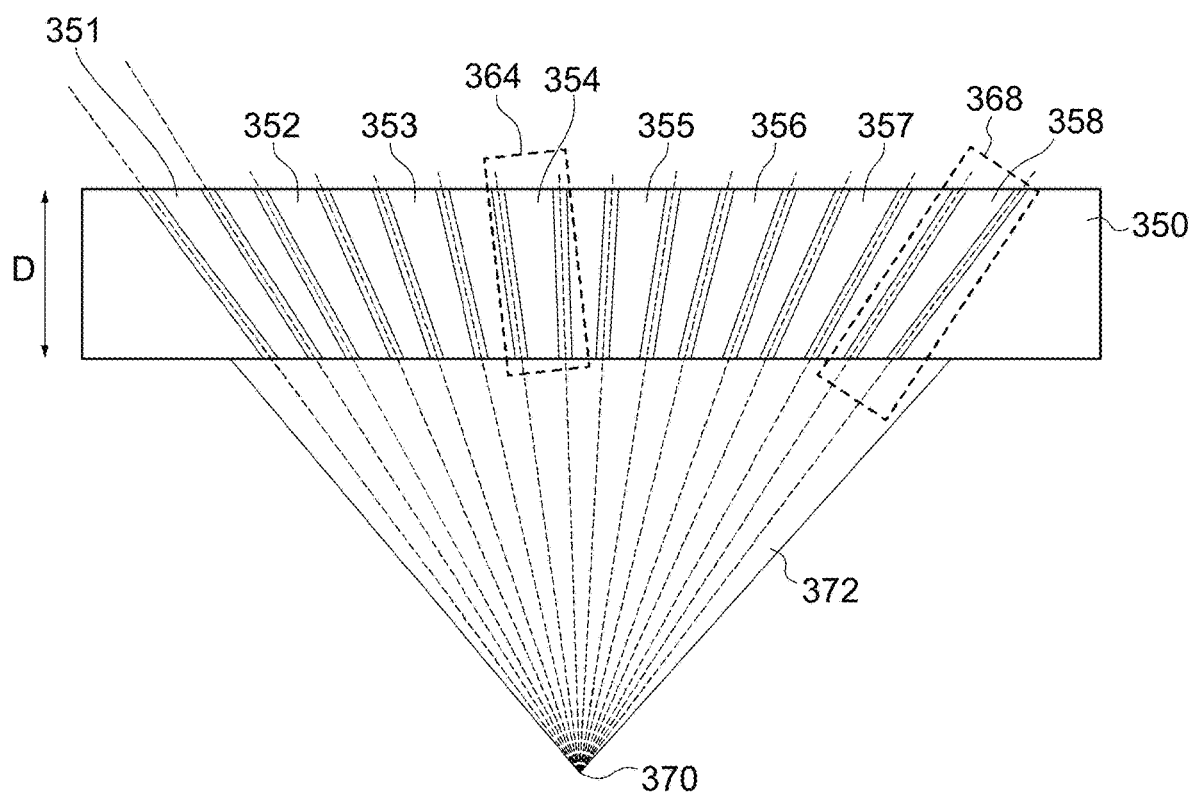
FIG. 3(c) is a sectional view of the beam former of FIG. 3(a).

FIG. 3c is a cross section of the mask 332 along a line B-B'. The cross section shows the truncated conical profile of each conical shell slit. Each slit extends through the thickness D of the body 350. The profile of each slit is defined such that a back projection of the slits would intersect at the EM point source 370. Therefore, the slit profile depends on the position of the slit along the longitudinal axis of the body 350. For instance, the profile of slit 364 is different from the profile of slit 368.

The eight conical slits define eight body portions 351-358 which may be held in position relative to the main body 350 by any appropriate means such as being attached via thin wires or by being held in place using electromagnets. When the primary beam 372 of X-ray radiation is incident on the mask 332, X-rays pass through the conical slit 361-368 but are blocked by the body 350, producing eight conical shells of X-ray radiation 201-208. The conical shells beams are provided in a same plane and diverge from each other. The divergence of the cone of radiation can be changed depending on the thickness of the body 350. The divergence decreases as D increases.

FIGS. 4(a)-4(f) illustrate different arrangements for the detection of scattered EM radiation.

Figure 9C:
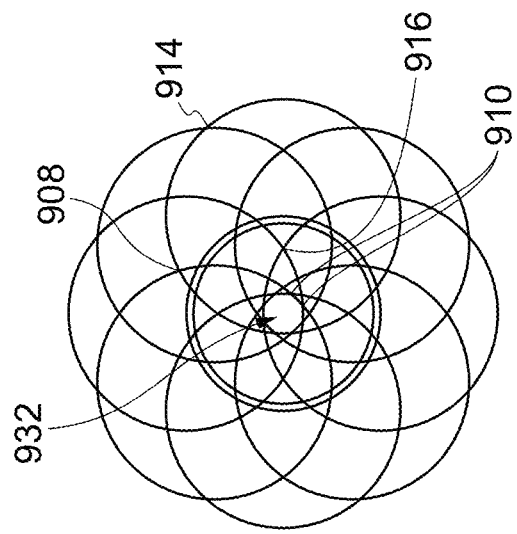
FIGS. 9(a)-9(c) show diagrams illustrating the formation of Debye rings produced by incident Debye cones of diffracted radiation.
Figure 9B:
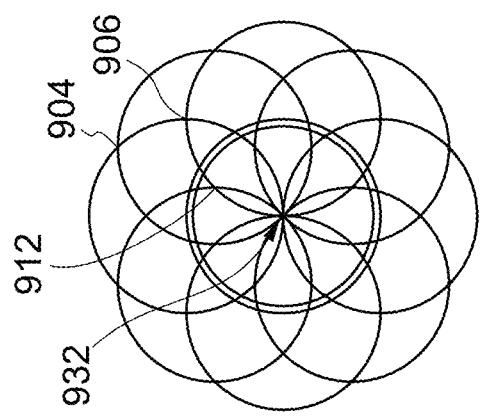
Figure 9A:
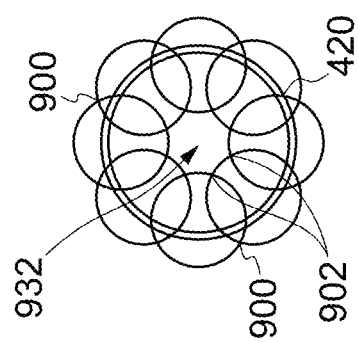

A small portion of an incoming, or primary X-ray beam incident onto a sample is scattered at measurable angles if its wavelength is similar to the lattice distances (or d-spacing) present in the sample material under inspection. For ideal, polycrystalline materials interrogated by pencil beams, the photon scatter follows a cone distribution, with the source of the scattering at the cone apex. These so-called Debye cones form substantially circular patterns when they intersect a flat detector or other surface normally as illustrated in FIGS. 9(a)-9(c).

The circles forming these patterns have a common centre coincident with that of the incident beam position on the detector. The angular distribution of the scattered intensity is unique to each different crystal structure and thus can be used to identify a material and determine characteristics such as lattice dimensions, crystallite size and percentage crystallinity. The key relationship between the lattice spacing (d), and the angle (θ) subtended by the diffracted or scattered radiation from a plane of atoms inside a crystal is embodied within the well-known Bragg condition: $n\lambda=2d \sin \theta$, in which λ is the wavelength of the incoming radiation and (n) is an integer. The angle subtended by the diffracted or scattered radiation and the interrogating or primary radiation is 2θ (two theta).

Figure 4A:
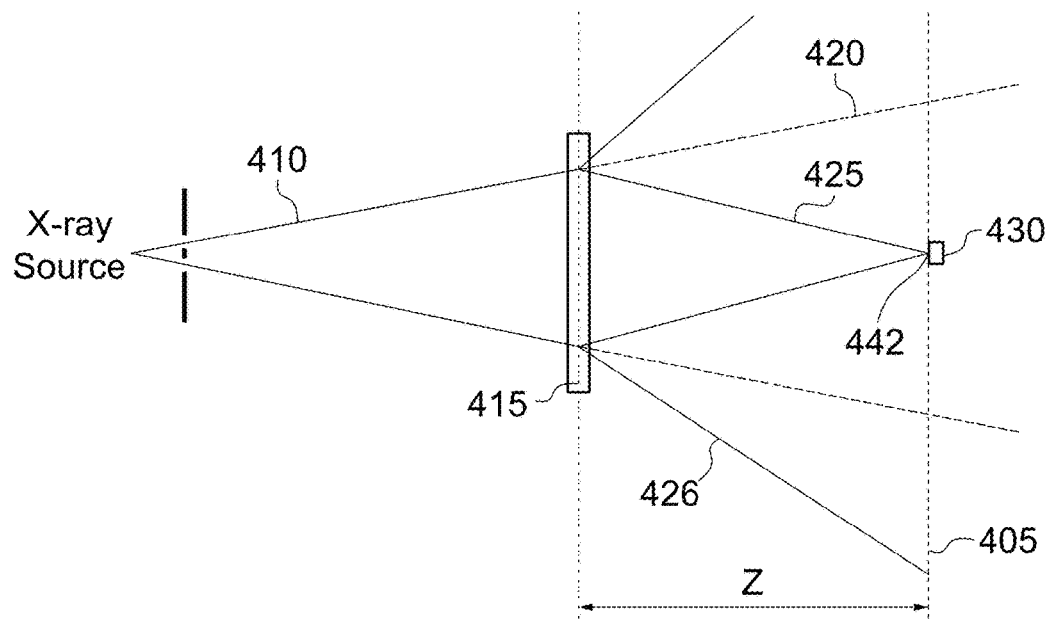
FIG. 4(a) is a diagram of a diffracted flux incident upon a point detector.
Figure 4B:
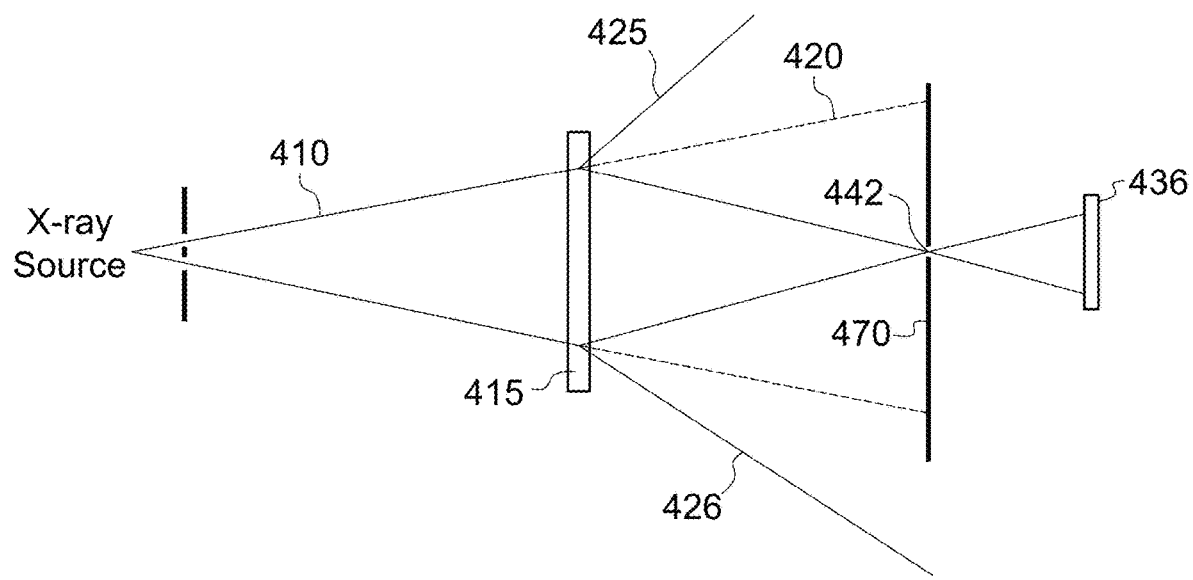
FIG. 4(b) is a diagram of diffracted flux incident upon an area detector via a central or coded aperture.
Figure 4C:
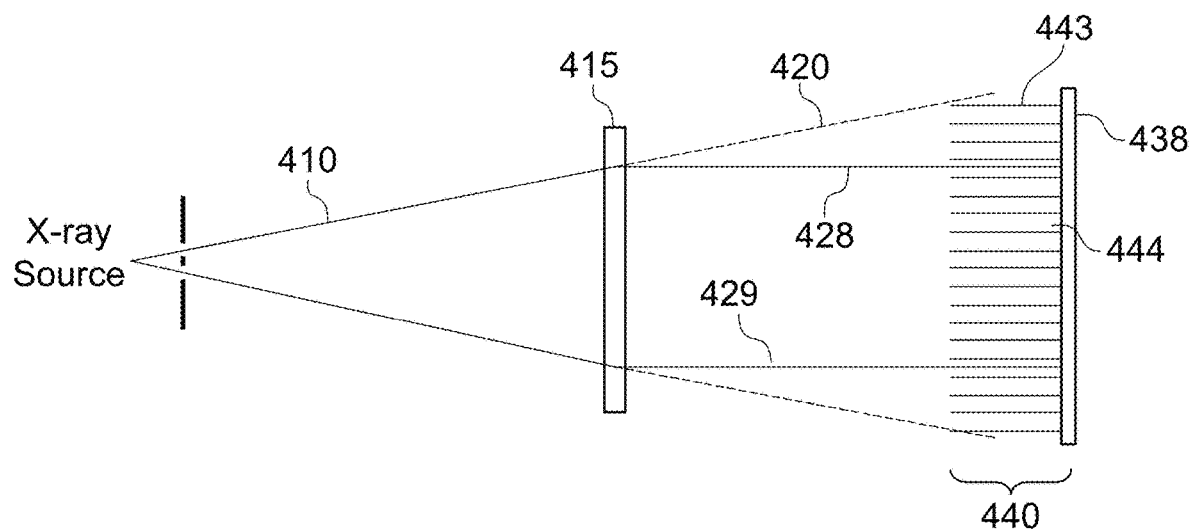
FIG. 4(c) is a diagram of diffracted flux incident upon an area detector provided with a grid structure.
Figure 4D:
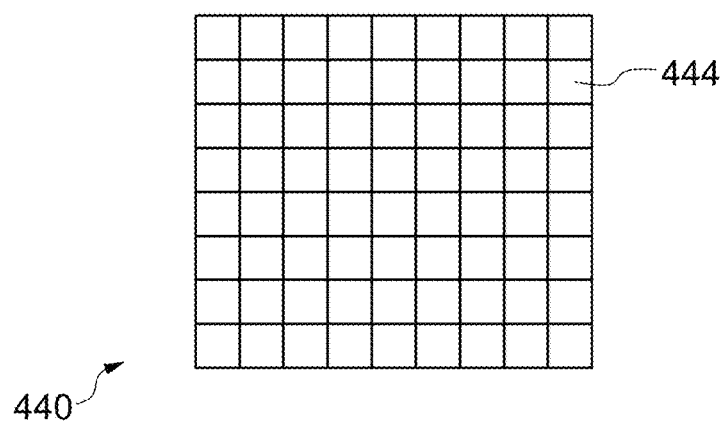
FIG. 4(d) is a front view of the grid structure of FIG. 4(c).
Figure 4E:
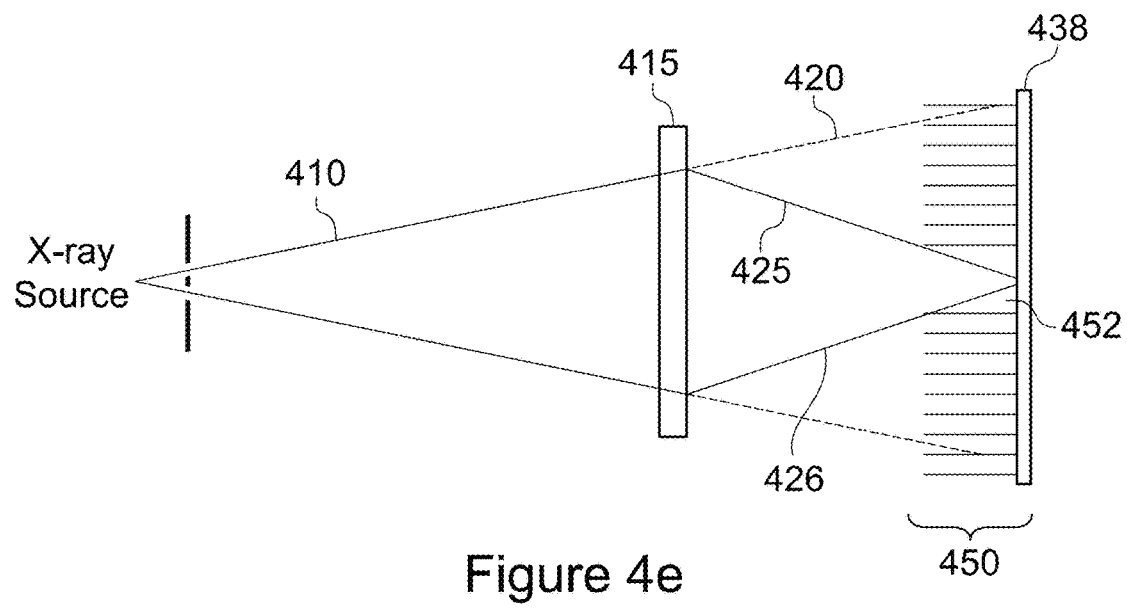
FIG. 4(e) is a diagram of a diffracted flux incident upon an area detector provided with a grid structure having a central opening.
Figure 4F:
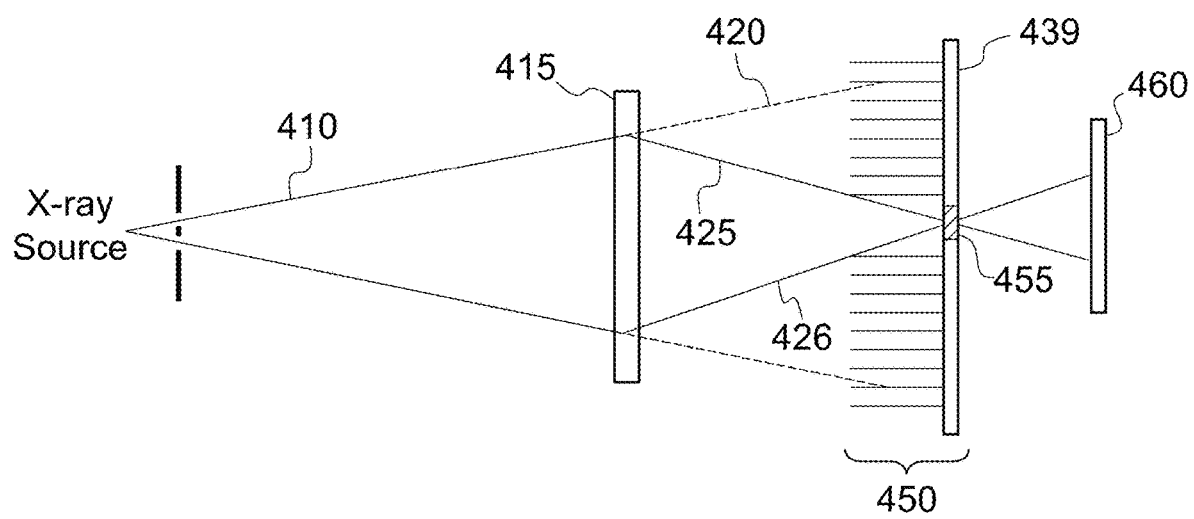
FIG. 4(f) is a diagram of a diffracted flux incident upon a detection system formed by two area detectors.

FIG. 4(a) shows a single conical shell of X-ray radiation 410 incident upon a sample 415 comprising a material having a degree of internal order with a certain d-spacing. A portion of the X-rays incident on the sample is scattered by the sample 415 by Bragg diffraction, another portion is absorbed by the sample and the remaining portion is transmitted through the sample. The sample 415 can be of numerous forms but in the example is depicted as a flat object.

The portion of transmitted radiation 420 diverges. The portion of diffracted radiation also referred to as diffracted flux, may be made of a plurality of cones of diffraction. Since the target sample 415 contains a polycrystalline material or a liquid having a certain degree of order, with a certain d-spacing, X-ray diffraction occurs causing a scatter of the photons in a conical distribution. These Debye cones are generated from every point along a circular target path defined by the intersection of the conical shell 410 with the sample 415. Two such Debye cones 425 and 426 are shown in FIG. 4a.

It is to be noted that Bragg's condition may be satisfied simultaneously by more than one wavelength, so if a broadband/polychromatic source is used together with an energy resolving sensor (to calculate wavelength), then condensation points at which rays from different Debye cones intersect could occur at different z positions or at a plurality of z positions along the propagation axis of the conical shell beam. These condensation points can be referred to as hotspots, and multiple hotspots may occur at a single position.

In FIG. 4, a portion of the Debye cones 425 and 426 converges to form a hotspot 442. In FIG. 4, the X-ray source is a polychromatic source. Therefore, a range of wavelengths satisfy the Bragg condition for a given d-spacing. The d-spacing is related to the Energy expressed in keV, by the equation $$E = 6.2/d \sin(\theta) \qquad (1)$$

in which θ is half the diffraction angle. As a result, a continuum of hotspots is formed along the propagation axis of the conical shell 410. These hotspots increase in energy as the two theta angle decreases. Hotspots, which form in front of a so-called pickoff point expand into a ring around this point whereas hotspots trying to form beyond the pickoff point also form a ring around the point. In both cases no signal is contributed to the measured hotspot, hence maximizing signal-to-noise.

A detector 430 is provided on the propagation axis of the single conical shell 410. The detector 430 may be a point detector arranged to receive the diffracted radiation 425 from the sample 415. For instance, the detector 430 may be an energy resolving detector. The detector 430 has a sensing area having a size sufficiently large to capture the diffracted radiation but small enough to avoid the detection of transmitted X-ray radiation 420. For instance, the detector 430 may be a point detector having a sensing area of about 1 mm² or a pixilated detector having a sensing area ranging from about 4 cm² to 20 cm². As such, the arrangement of FIG. 4(*a*) provides a dark field detection scheme. As the distance between the EM source and the detector increases, the two-theta diffraction angle increases to produce a higher energy diffracted flux incident on the detector.

Using the arrangement of FIG. 4(*a*), a spectral measurement can be obtained and a range of potential d-spacing may be calculated for each wavelength.

FIG. 4(*b*) shows another dark field detection arrangement that includes a plate 470 with a pinhole or aperture and a detector 436. The aperture is used to encode sample range and/or diffraction angle. The plate 470 is positioned such that the aperture is located at or near the hotspot 442 and the detector 436 is provided at a distance further away from the aperture. In this case the plate 470 blocks the transmitted radiation 420. The detector 436 has an area large enough to detect rings of Debye cone intersections referred to as caustic curves, or simply caustics. A caustic comprises an envelope of a family of curves, formed by overlapping Debye rings, in the plane of the detector. Therefore, the shape of the caustic is a curve, which is tangent to each member of a family of Debye rings at some point. The plate 470 provides a pinhole projection of the interior of the conical shell beam 410. The pinhole projection comprises diffracted flux from a thin sample normal to the conical shell's symmetry axis producing a circular caustic. Alternatively, the arrangement of FIG. 4(*b*) may be implemented without the plate 470.

Each detector may also be provided with a radiation shield to block radiations from adjacent diffracted beams. For example, a radiation shield may be provided on each side of the detector. The detector may be a Cadmium Telluride (CdTe) detector with a sensing area of about 4 cm² or more.

FIG. 4(*c*) shows another arrangement for gathering scattered EM radiations. This arrangement shares common features with the arrangement of FIG. 4(*a*) and so like components are illustrated with like reference numerals.

In this example, a grid structure 440 is provided in front of a pixelated energy resolving detector 438. The grid structure 440 is designed to constrain the incidence of electromagnetic radiation onto the detector 438. For instance, scattered rays 428 and 429 are allowed to reach the detector 438, while other beams scattered with different angles are prevented from reaching the detector, hence only collecting data from samples having a particular scattering angle. The advantage of this approach is that the energy profile of the diffracted flux for each d-spacing is nominally independent of its position along the propagation axis making the identification of material parameters easier by virtue of the reduced problem search space. An additional advantage is that detectors fabricated with a single detection surface or alternatively a detector surface that employs relatively larger and therefore fewer pixels are easier to manufacture in comparison with densely pixelated detectors or sensors.

FIG. 4(*d*) shows a front view of the grid structure 440. The grid structure is formed of walls also referred to as lamellae or septa. The lamellae may be relatively thin plates of material formed from suitable material to block or substantially attenuate X-ray radiation, such as tungsten or lead antimony alloy. As a non-limiting example, the lamellae could have a thickness of the order of 0.1 mm to 1 mm and a height of the order 1 cm to 30 cm or more.

The grid structure 440 provides a plurality of cells 444. FIG. 4(*d*) illustrates an embodiment, in which the grid is formed from transverse and longitudinal lamellae forming a grid of cells 444 which have a substantially square cross-section. It is to be appreciated that cells could be formed with other shapes such as triangular or hexagonal for example and that the grid peripheral shape could be circular or any other shape that is convenient to manufacture.

FIG. 4(*e*) shows another arrangement for gathering scattered EM radiations. This arrangement shares common features with the arrangement of FIG. 4(*c*) and so like components are illustrated with like reference numerals. In this example the grid structure is provided with a cut-out portion 452. The shape of the cut-out portion 452 is designed to permit the travel of incident beams 425 and 426 contributing to a hotspot to be sensed by the detector 438.

FIG. 4(*f*) shows another arrangement for gathering scattered EM radiations. This arrangement shares common features with the arrangement of FIG. 4(*e*) and so like components are illustrated with like reference numerals. In this example, the pixelated energy resolving detector 439 has been modified to include a coded aperture 455 allowing the beams 425 and 426 to be transmitted through it. A second detector 460, also referred to as depth decoding detector or range detector, is located behind the detector 439 to detect a caustic rim.

The coded aperture 455 may be void of solid material, hence a pinhole. In an alternative embodiment the aperture may comprise solid material that lets incident radiation of the relevant energy pass through it. The coded aperture 455 may be provided at a centre point of the detection surface of the detector 439, and so effectively forms a lens which produces an image on the surface of the second detector 460. The known geometric configuration of the coded aperture and the conical shell beam 410 enables the depth or range of a source of diffracted flux to be computed for softer radiation satisfying Bragg's condition in comparison to the gridded or collimated radiation. The coded aperture 455 allows collecting additional flux for analysis.

The apparatus of FIGS. 1 and 2, may be implemented with different detection arrangements as described in FIGS. 4(*a-f*). Each detector 141-148 may be implemented with the same detection arrangement for example as a point detector as described in FIG. 4(*a*). Alternatively, the apparatus of FIG. 1 may be implemented using a combination of different detection schemes, including a mixture of point detectors as described in FIG. 4(*a*) and detection arrangements as described in FIGS. 4(*b-f*). When such a mixture is provided, the different types may suitably be interleaved, that is, provided in an alternating pattern around the detection area. One or more detectors may be implemented to detect X-ray absorption of the conical shell radiation 410 through the sample 415. A single detection surface referred to as ring detector could also be used to detect both absorption signals as well as diffracted or scattered flux.

When implementing a detection using a coded aperture or a grid together with a spatially resolved detector as shown above with reference to FIGS. 4b, 4c, 4e and 4f, a snapshot image of the diffracting sample may be obtained without the need for applying back-projection.

Using for example a rotary encoder or angle transducer, it is possible to identify the direction of the propagations axes of the conical shell beams for different times. A three-dimensional (3D) matrix of volume element may then be obtained by accumulating all the energy measurements and the calculated material parameters over a single rotation of the multiple conical shell beams.

This matrix of volume elements may be viewed by compressing or integrating the measurements into a plane defined by the characteristic propagation axes to produce a relatively crude cross-sectional image. The spatial fidelity and material parameter fidelity may be improved by introducing a motion along the rotation axis and compositing more measurements in the matrix and viewing it as a 3D constructed slice or series of such slices to form a complete volumetric dataset or image. The radial positions in the image encodes the position of the sample along a characteristic propagation axis.

Figure 5:
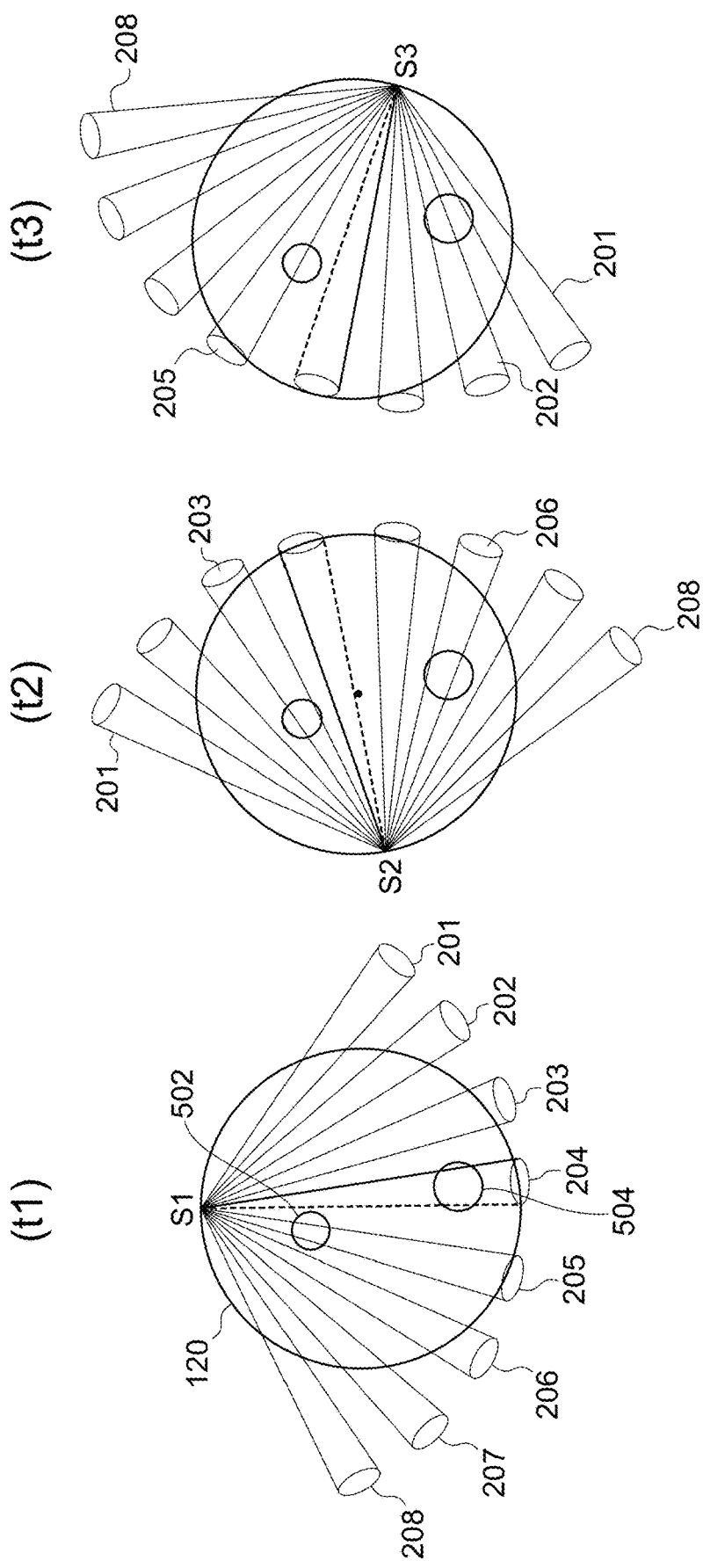
FIG. 5 is an arrangement of eight conical shells of X-ray radiation shown at different times.

FIG. 5 illustrates eight conical shells of X-ray radiation 201-208 at three different times t1, t2 and t3, as the EM emitter 130 moves along its circular trajectory from position S1 at time t1, to S2 at time t2 and S3 at time t3. Two different samples labelled 502 and 504 are present in the container 112. The samples 502 and 504 are illuminated with different angles of incidence by different conical shells at different points in time.

Figure 6:
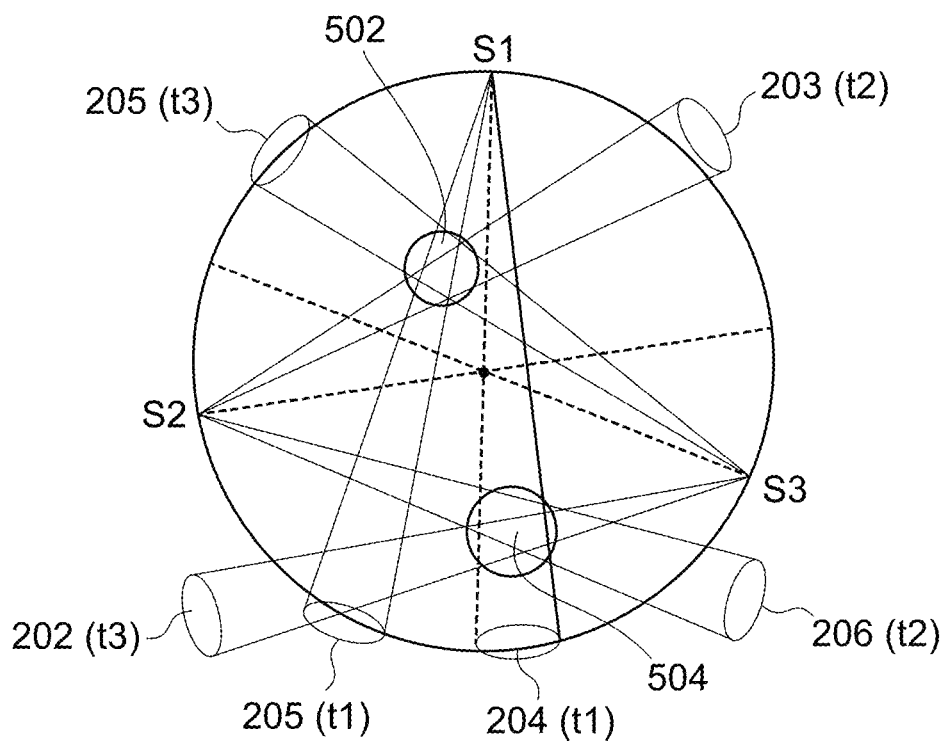
FIG. 6 is an overlay of the conical shells shown in FIG. 5.

FIG. 6 shows an overlay of the conical shells at times t1, t2 and t3. For clarity, only the relevant conical shells are shown. It can be observed that during data collection, the sample 502 has been probed at three different angles by beam 205 at time t1, beam 203 at time t2 and beam 205 at time t3. Similarly, the sample 504 has been probed at three different angles by beam 204 at time t1, beam 206 at time t2 and beam 202 at time t3.

As mentioned above, the system may operate as a pre-screener to identify a path of least-absorption at which the detected signal may be the strongest and referred to as staring-path. For instance, the system could be operated at relatively fast speed to identify that beam 204 obtained at time t1, when the source emitter is located at position S1, provides more signal than beam 206 at time t2 or beam 202 at time t3. In this example, the system could be operated to probe the sample using this staring-path to identify the sample. The system could collect data for an extended period of time along the staring-path, hence sufficiently long to calculate a d-spacing of the sample of interest. In this scenario, the system would collect data arising from the conical shell beam 204 and may not need to collect data arising from the other beams. Using this approach, the nature of a target sample may be identified quickly.

An image of the sample or tomogram may be obtained by collecting data arising from the other beams. This may be achieved using a reconstruction algorithm such as a back-projection algorithm.

Using the arrangement as described in any of the FIGS. 4(b), 4(c), 4(e) and 4(f), the energy of the detected signal can be measured along an axial position. Axially-resolved d-spacings may then be calculated for various annular gauge volumes, for each discrete rotation position. The spatial distribution of d-spacings over a full or partial set of conical shell rotation positions can then be used to compose a tomogram.

Figure 7A:
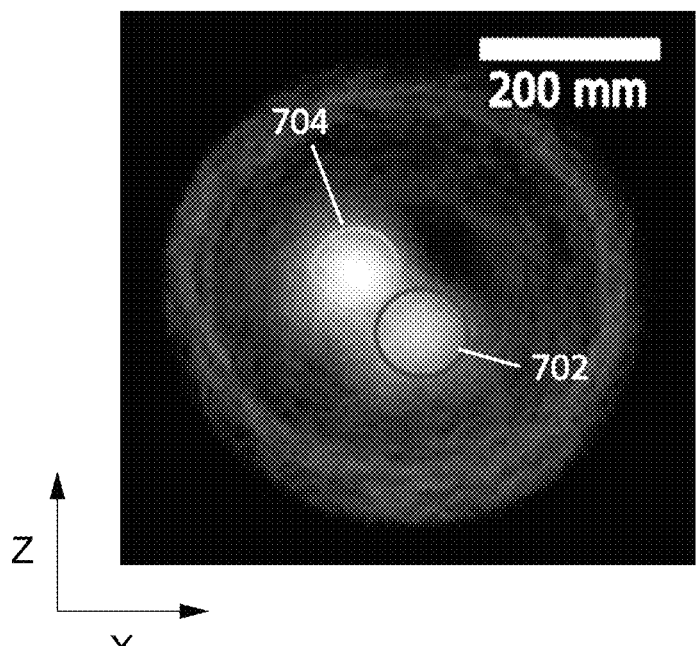
FIG. 7(a) is a reconstructed cross-sectional view of two bottles filled with different liquids as produced by the apparatus of FIG. 1.
Figure 7B:
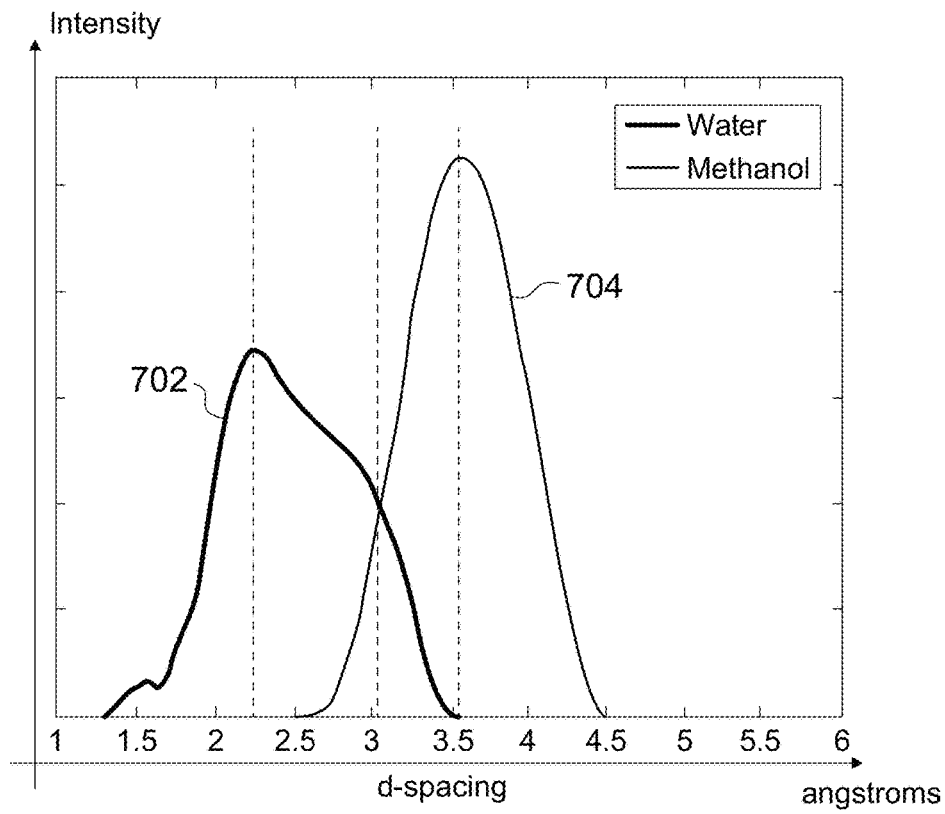
FIG. 7(b) is a diffractogram obtained from FIG. 7(a).

FIG. 7 (a) shows a reconstructed cross-sectional image (diffracted flux) of a first bottle filled with water and a second bottle filled with methanol. The image displays a first diffuse halo 702 arising from the bottle filled with water, and a second diffuse halo 704 arising from the bottle filled with methanol. For this experiment, the beam and detectors were configured as in the arrangement described in FIG. 4(a). The tomographic image was obtained using back-projected d-spacing values, in which the intersections of d-spacing having a same value produce a d-spacing tomogram.

Liquids display a degree of local order. For instance, the smallest measurement distance that enables one to distinguish between two atoms can be defined as the sum of their respective radii. Similarly, in a molecule, the length of the molecule's bonds and the angles between bonds results in additional quasi-fixed, average intramolecular distances. These quasi-fixed distances provide a degree of local order which may be used to identify the nature of a liquid sample.

Constructive interferences arise in a liquid when the inverse of the minimum distance of a pair of atoms is of the order of the scattering vector, S defined as:

$$S=2\sin(\theta)/\lambda \quad (2)$$

in which $\theta$ is the angle subtended by the diffracted or scattered radiation from a plane of atoms inside the sample; and $\lambda$ is the wavelength of the incoming EM radiation. The intensity modulation of diffraction data from liquids can therefore be expressed as a function of the magnitude of the scattering vector S.

Structural short-range order information can be characterised either by the pair correlation function g(r) which defines the probability of finding a particle at a distance, r, from another; or by the radial distribution function RDF(r) which defines the number of particles in a shell of radius, r, and width, □r. The radial distribution function RDF can be expressed in terms of the pair correlation function g(r) as:

$$RDF(r)=4\pi r^2 \rho_o g(r) \quad (3)$$

in which $\rho_o$ is the average molecular density of the material. In contrast to the numerous sharp Debye rings produced by polycrystalline materials, the short-range order of liquids leads to a distribution dominated by one or more diffuse halos.

FIG. 7 (b) illustrates a diffractogram obtained from FIG. 7 (a). The water and methanol samples can be clearly identified. The water signal 702 shows a first peak around 0.23 nm and a second peak around 0.3 nm. The second broad peak with a maximum at 0.324 nm arises from the intermolecular interference of the nearest neighbour oxygen-oxygen (O—O) atoms. The methanol signal 704 displays a single peak around 0.35 nm. The intensity of the signal derived from methanol is greater than the intensity of the signal derived from water.

A security screening system may be looking for various target liquids including threat liquids, drugs or pharmaceutical compounds in liquid form as well as other liquids deemed illicit, for example alcohol-based beverages. Threat liquids including flammable, explosive or poisonous liquids, can possess a higher electron density and a lower linear absorption coefficient ($\mu$) in comparison to non-threat liquids. Characteristics such as nearest neighbour distances and coordination numbers can be derived from measurements of the scattering distributions and thus, even for short range structural order liquids, discrimination is possible. Differences in modulation frequency as well as the magnitude of the scattering vector may be used to identify a target liquid. In general, any liquid or group of liquids may be classified as targets as per the requirements of the application under consideration. For instance, a library of target liquids may be used that lists the maxima associated with certain d-values for each liquid of interest.

Figure 8:
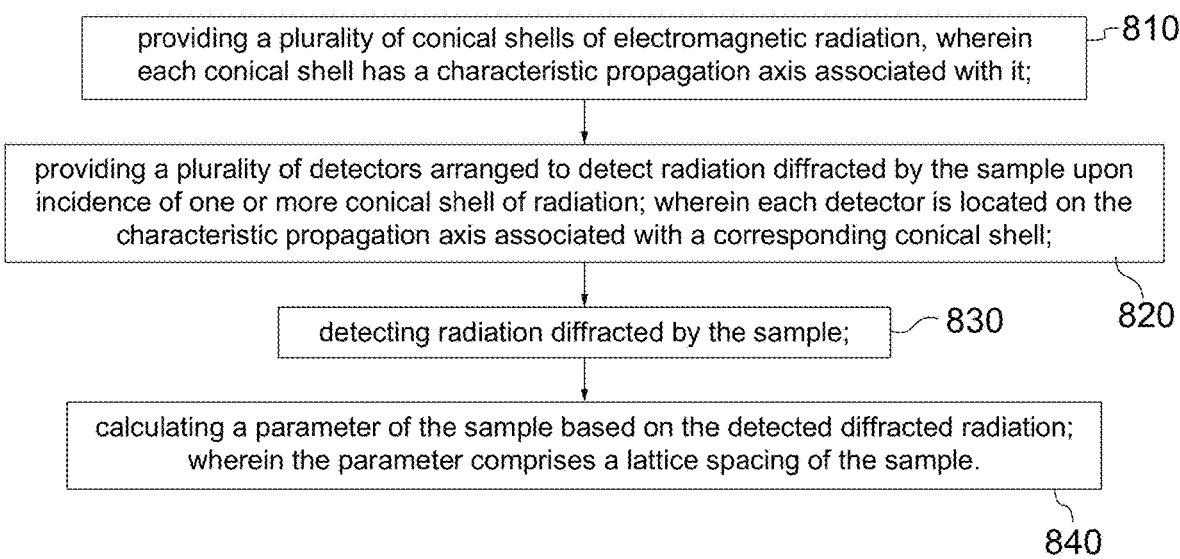
FIG. 8 is a flow diagram of a method for identifying a sample.

FIG. 8 illustrates a flow chart of a method for detecting a sample. At step 810, a plurality of conical shells of EM radiation is provided. Each conical shell has a characteristic propagation axis associated with it. At step 820, a plurality of detectors arranged to detect radiation diffracted by the sample upon incidence of one or more conical shells of radiation are provided. Each detector is located on the characteristic propagation axis associated with a corresponding conical shell. At step 830, EM radiation diffracted by the sample is detected. At step 840, a parameter of the sample is calculated based on the detected diffracted radiation. The parameter comprises a lattice spacing of the sample.

The proposed method allows identifying an item such as a threat liquid rapidly and with a good accuracy.

FIGS. 9(a)-9(c) with reference to FIG. 4(a) illustrates a superposition of the cross-sections of some Debye cones from the target object 415 at the detection surface 405 for three different values of the distance Z shown in FIG. 4(a). For ease of illustration the footprint of the Debye cones is shown as being circular. In fact, the cross section of Debye cones will be elliptical. However, this does not change the working principle of the apparatus as described herein, and circular patterns are shown for clarity of illustration.

In all three examples the annulus of primary X-rays 420 is illustrated for comparison purposes. In FIG. 9a, the detection surface 405 is at a distance Z=z1 where the diameters of the Debye cones are still significantly smaller than the diameter of a circular target path defined by the intersection between 410 and object 415. The Debye cones produce a series of circles which in practice will be continuous but only a small selection is shown here for illustrative purposes. At certain points 900, 902 the circles overlap thus increasing the intensity at those points to approximately double elsewhere on the circle and forming two rings of relatively increased intensity, referred to herein as rims. However, there are no circular paths through the centre 932, resulting in an approximately zero intensity of X-rays at the centre point 932, where a sensor (for example 430) may be present.

In FIG. 9b the detection surface 405 is at a distance Z=z2 where the diameters of the Debye cones are equal to the diameter of the circular target path. In FIG. 9b there are numerous overlapping points such as points 904, 906 where two or three cones coincide increasing the intensity of X-ray radiation at those points. However, all of the cones contribute to the intensity at the very centre 932 of detection surface 405 and form a hotspot where the sensor is present. Accordingly, the intensity of radiation at this point is greatly increased.

In FIG. 9c, the detection surface 405 is at a greater distance Z=z3 where the diameters of the Debye cones are now significantly larger than the diameter of the circular target path. In this example there are several points of overlap between the circles of the Debye cones such as points 908, 910. However, there is no point at which all of the cones are coincident. None of the circles pass through the centre point 932 and therefore there is approximately zero intensity of X-rays in the centre 932 where the sensor is present.

Accordingly, there is substantially zero X-ray radiation detected at the sensor at the centre point 932 in FIGS. 9a and 9c whilst there is a great intensity from each of the cones, forming a hotspot at a single point at the centre point 932 in FIG. 9b.

If a broadband/polychromatic source is used then hotspots could occur at different z positions or at a plurality of z positions, and multiple hotspots may occur at a single position.

Figure 10:
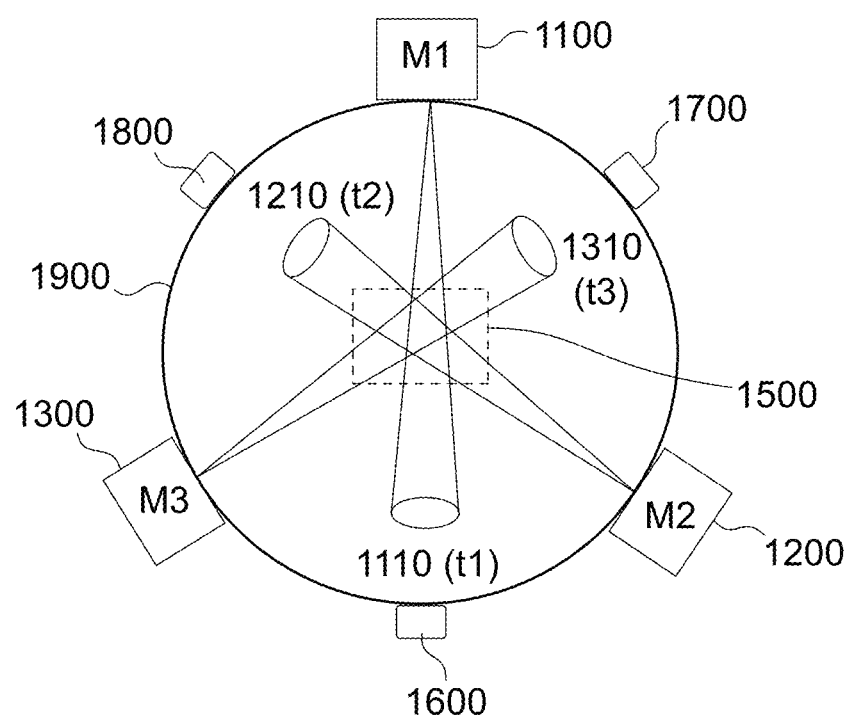
FIG. 10 is a diagram of another apparatus for identifying a sample.

FIG. 10 illustrates a modified version of the system of FIG. 1. In this embodiment multiple stationary EM emitters are used in combination with a plurality of stationary detectors.

A circular frame 1900 is provided with three EM sources M1 1100, M2 1200, and M3 1300. The frame 1900 defines a sample chamber for receiving a sample 1500. In this example the three EM sources are provided at equidistance from each other on the circular frame 1900. One or more detectors are provided opposite each emitter. For clarity only three detectors are represented, detector 1600 opposite M1, detector 1800 opposite M2 and detector 1700 opposite M3. Each EM emitter is adapted to generate a plurality of conical shells of EM radiations as described above with reference to FIG. 3. Each emitter may generate four conical shells of radiation resulting in a total of twelve conical shell beams. For clarity FIG. 10 only shows, a single beam per EM emitter.

It will be appreciated that the number of EM emitters may vary as well as the number of detectors. For example, twelve detectors or more could be distributed along the circular perimeter of the frame 1900. The position of each emitter may also vary depending on the application. Similarly, the number of conical shell beams provided by each emitter may vary.

In operation, the EM emitters M1, M2 and M3 emit electromagnetic radiation sequentially. For instance, M1 emits beam 1110 at time t1, M2 emits beam 1210 at time t2 and M3 emits beam 1310 at time t3. If each emitter provides four beams then the emitters M1, M2 and M3 may be adapted to emit each one of the twelve beams in a particular sequence. Such a sequence may be used to identify a particular path of least absorption, as described above.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

The invention claimed is:

1. An apparatus for identifying a sample, the apparatus comprising:
   a platform for receiving the sample;
   at least one electromagnetic radiation emitter adapted to provide a plurality of conical shells of radiation; wherein each conical shell has a characteristic propagation axis associated with it;
   a plurality of detectors arranged to detect radiation diffracted by the sample upon incidence of one or more conical shells of radiation; wherein each detector is located on the characteristic propagation axis associated with a corresponding conical shell; and a calculator adapted to calculate a parameter of the sample based on the detected diffracted radiation; wherein the parameter comprises a lattice spacing of the sample.

2. The apparatus as claimed in claim 1, wherein the at least one electromagnetic radiation emitter and the plurality of detectors are provided on a frame having a closed-shaped perimeter.

3. The apparatus as claimed in claim 1, wherein the plurality of conical shells of radiation diverge from each other and wherein the characteristic propagation axes associated with the plurality of conical shells of radiation are distributed in a single plane.

4. The apparatus as claimed in claim 1, wherein the electromagnetic radiation emitter further comprises a source of electromagnetic radiation coupled to a beam former, and wherein the beam former further comprises a body provided with a plurality of slits having a truncated conical shape profile to provide the plurality of conical shells of radiation.

5. The apparatus as claimed in claim 1, wherein the electromagnetic radiation emitter further comprises a slit collimator to generate a fan-shaped beam.

6. The apparatus as claimed in claim 1, wherein the source of electromagnetic radiation further comprises at least one of a source of ionizing radiation and a polychromatic source.

7. The apparatus as claimed in claim 1, further comprising a controller to control an operation of the apparatus, wherein the controller is adapted to identify a preferred sampling configuration corresponding to a maximum detected signal strength.

8. The apparatus as claimed in claim 7, wherein the apparatus is adapted to collect data for an extended period of time in the preferred sampling configuration.

9. The apparatus as claimed in claim 7, further comprising a mechanical arrangement adapted to rotate the electromagnetic radiation emitter and the plurality of detectors with respect to a rotational axis.

10. The apparatus as claimed in claim 7, wherein the at least one electromagnetic radiation emitter further comprises a first electromagnetic radiation emitter adapted to provide a first set of conical shells of radiation, and a second electromagnetic radiation emitter adapted to provide a second set of conical shells of radiation, and wherein the first and second electromagnetic radiation emitters are adapted to emit each conical shell of radiation among the first and second set in a chronological order, or to emit each conical shell of radiation among the first and second set simultaneously.

11. The apparatus as claimed in claim 9, wherein the controller is coupled to the platform and to the mechanical arrangement, wherein the controller is adapted to move at least one of the platform and the mechanical arrangement to identify the preferred sampling configuration.

12. The apparatus as claimed in claim 10, wherein the controller is adapted to set a sequence defining the chronological order.

13. The apparatus as claimed in claim 1, wherein the calculator is adapted to run an artificial intelligence algorithm or a deep learning algorithm to identify the parameter of the sample.

14. The apparatus as claimed in claim 1, wherein the calculator is adapted to perform a back-projection along the plurality of conical shells to obtain an image of the sample.

15. The apparatus as claimed in claim 1, wherein the plurality of detectors further comprises a plurality of point detectors, or wherein the plurality of detectors further comprises a plurality of area detectors.

16. The apparatus as claimed in claim 15, wherein at least some of the area detectors are provided with a grid structure formed of cells, and/or at least one of the area detectors is provided with a coded aperture, and further comprising a range detector, wherein the range detector is arranged to collect radiation transmitted through the coded aperture.

17. A method of identifying a sample, the method comprising:
providing a plurality of conical shells of electromagnetic radiation; wherein each conical shell has a characteristic propagation axis associated with it;
providing a plurality of detectors arranged to detect radiation diffracted by the sample upon incidence of one or more conical shells of radiation; wherein each detector is located on the characteristic propagation axis associated with a corresponding conical shell;
detecting radiation diffracted by the sample; and
calculating a parameter of the sample based on the detected diffracted radiation;
wherein the parameter comprises a lattice spacing of the sample.

18. The method as claimed in claim 17, comprising illuminating the sample with a different conical shell of radiation at different points in time.

19. The method as claimed in claim 17, further comprising identifying a preferred sampling configuration corresponding to maximum detected signal strength, wherein identifying the preferred sampling configuration comprises identifying a position of an electromagnetic radiation emitter providing the plurality of conical shells of radiation at a particular point in time, and identifying a specific detector among the plurality of detectors to perform data collection.

20. The method as claimed in claim 17, further comprising rotating the plurality of conical shells of electromagnetic radiation and the plurality of detectors with respect to a rotational axis, identifying directions of the propagation axes of the conical shell beams for different times, forming a three-dimensional matrix by accumulating the detected radiation diffracted by the sample over a rotation of the plurality of conical shell, and integrating elements of the matrix to form an image.

* * * * *